(12) United States Patent
Turley et al.

(10) Patent No.: US 9,781,342 B1
(45) Date of Patent: Oct. 3, 2017

(54) SYSTEM AND METHOD FOR IDENTIFYING COMMENT CLUSTERS FOR PANORAMIC CONTENT SEGMENTS

(71) Applicant: GOPRO, INC., San Mateo, CA (US)

(72) Inventors: Logan Turley, Pacifica, CA (US); David Chalmers, San Mateo, CA (US); Todd Garnet Wagner, San Francisco, CA (US); Karan Nischol, San Francisco, CA (US)

(73) Assignee: GoPro, Inc., San Mateo, CA (US)

(*) Notice: Subject to any disclaimer, the term of this patent is extended or adjusted under 35 U.S.C. 154(b) by 232 days.

(21) Appl. No.: 14/920,655

(22) Filed: Oct. 22, 2015

(51) Int. Cl.
*H04N 5/232* (2006.01)
*G02B 27/01* (2006.01)

(52) U.S. Cl.
CPC ....... *H04N 5/23238* (2013.01); *G02B 27/017* (2013.01)

(58) Field of Classification Search
CPC ................... H04N 5/23238; G02B 27/017
USPC .......................................... 348/36
See application file for complete search history.

(56) References Cited

U.S. PATENT DOCUMENTS

| 8,990,328 B1 | 3/2015 | Grigsby |
| 9,142,257 B2 | 9/2015 | Woodman |
| 2010/0199182 A1 | 8/2010 | Lanza |
| 2016/0029105 A1 | 1/2016 | Newman |
| 2016/0189752 A1 | 6/2016 | Galant |

OTHER PUBLICATIONS

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

*Primary Examiner* — Jay Patel
*Assistant Examiner* — Marnie Matt
(74) *Attorney, Agent, or Firm* — Sheppard Mullin Richter & Hampton LLP

(57) ABSTRACT

Systems and methods for identifying comment clusters for panoramic content segments. A panoramic content segment of digital content may be hosted to client computing platforms. User comment information may be received. The user comment information may convey user comments, include time indications for a duration of a content segment, and/or include location indications for a panorama of the panoramic content segment. A comment distribution may be determined from the user comment information. A comment cluster may be identified based on the comment distribution. View information may be received from a client computing platform. Whether a view range associated with the comment cluster identified is located within or outside one or more visible ranges of viewing angles selected by the user may be determined. Alert information may be generated and/or transmitted for effectuating presentation of a notification on the client computing platform associated with the user.

20 Claims, 5 Drawing Sheets

SYSTEM AND METHOD FOR IDENTIFYING COMMENT CLUSTERS FOR PANORAMIC CONTENT SEGMENTS

FIELD OF THE INVENTION

The systems and methods described herein generally relate to identifying comment clusters for panoramic content segments.

BACKGROUND OF THE INVENTION

Typically, users may comment on and/or interact with digital content viewed from a single point of view. The number of views may be tracked and/or users' comments may be displayed below the window in which the digital content is presented. Directing a user's attention and/or determining where within the digital content a user chooses to direct his attention may be difficult and/or provide a limited amount of information.

Digital content having multiple views may compound the issues and/or potential issues of single view digital content. If users are able to choose their view point, they may miss content available in the digital content. Missing content may cause the user to have a less than satisfactory experience, and/or may defeat the purpose of monetizing content presented within the digital content.

SUMMARY

The disclosure herein relates to identifying comment clusters for panoramic content segments. The comment clusters may represent user comments directed to the same period of time and/or location within a panoramic content segment. A panoramic content segment may include digital content presented in a wide view, spherical view, 180-degree view, three-dimensional view, two-dimensional view, and/or other panoramic view. A user viewing the panoramic content segment may not be able to view the entire panorama through a single field of view. Instead, a user may be able to select a field of view within the panoramic content. Such selection may change over the course of presentation of the panoramic content. As such, a user may miss events occurring outside the user's selected field of view within the panoramic content segments.

The system and/or methods described herein may be configured to receive user comment information conveying user comments directed to various locations and/or points in time within the panoramic content segment. The system and/or method may determine a comment distribution representing the number of user comments for various points in time across the segment duration and various viewing angles across a panorama of the panoramic content segment. Comment clusters corresponding to user comments for a given period of time and/or at a given location may be identified. The comment clusters may indicate one or more events occurring during the given period of time and/or at the given location within the panoramic content segment. The system and/or method may determine whether a comment cluster is within the user's current field of view. Responsive to a comment cluster being outside the current field of view selected by the user, alert information may be generated and/or transmitted to a client computing platform associated with the user (e.g., via which the user may be viewing the panoramic content segment). The alert information may cause the client computing platform to present a notification to the user. The notification may indicate an event (e.g., indicated by an identified comment cluster) is occurring, has occurred, and/or is about to occur outside the current field of view selected by the user.

A system configured to identify comment clusters for panoramic content segments may include one or more server(s). The server(s) and the client computing platform(s) may communicate in a client/server configuration, and/or via another configuration. The server may include one or more processors configured by machine-readable instructions to execute computer program components. The computer program components may include a panoramic content component, a comment component, a comment distribution component, a view information component, a notification component, and/or other components.

The panoramic content component may be configured to host one or more panoramic content segments of digital content over a network. A panoramic content segment may be hosted to one or more client computing platform(s). Users may consume the panoramic content segments by viewing the panoramic content segments via the one or more client computing platforms, display devices associated with the client computing platforms (e.g., a head mounted display), and/or other devices. Users may be able to select their field of view within the panorama of the panoramic content segment. A panoramic content segment may include any wide angle view of a digital content segment and/or a view of a digital content segment wherein at least a portion of the digital content is outside the viewpoint of a user at a given time.

The comment component may be configured to receive user comment information. The user comment information may convey one or more user comments for the panoramic content segment. The user comments may be directed to one or more events that occur within the panoramic content segments. The user comment information may include one or more time indications, location indications, and/or other information associated with one or more user comments. An individual time indication may identify a point in time in the segment duration of the panoramic content segment to which an individual user comment may be directed. An individual location indication may identify a viewing angle within the panorama of the panoramic content segment to which an individual user comment may be directed. In some implementations, the viewing angle may include one or more dimensions of view information identifying where within the panorama of a panoramic content segment a comment is directed, and/or what field(s) of view will be able to observe the portion of the panoramic content segment to which the comment is directed.

In some implementations, the user comment information may include targeted comment information conveying one or more targeted comments for the panoramic segment. A targeted comment may include a comment wherein the represented source includes one or more of another user that is connected to the user via a social networking platform, a controlling entity, and/or other another user or entity.

The comment distribution component may be configured to determine a comment distribution for the panoramic content segment. The comment distribution may be determined based on the user comment information. The comment distribution may represent three or more dimensions of data (e.g., time, location, quantity, and/or other data). For example, the user comments may be plotted as a function of number of user comments, points in time across the segment duration, viewing angles across the panorama of the panoramic content segment, and/or otherwise plotted.

The comment distribution component may be configured to generate a graphical representation of the determined comment distribution for the panoramic content segment. The graphical representation of the comment distribution may include a heat map, and/or other graphical representation. The comment distribution component may be configured to identify one or more comment clusters based on the comment distribution for the panoramic content segment. The comment clusters may be identified based on the user comment information including time indications that identify points in time that are within a given period of time within the segment duration, location indications that identify viewing angles that are within a given view range within the panorama of the content segment, and/or other information. For example, a comment cluster may be identified where user comments are directed to points in time that are close together within the segment duration such that the points in time fit within the given time period; and/or where user comments are directed to viewing angles that are close together within the panorama such that the viewing angles fit within the given view range.

The view information component may be configured to receive view information over a network from a client computing platform associated with the user. The view information may be received in a recurring or ongoing matter. The view information may indicate the current field of view selected by the user during presentation of the panoramic content segment. As such, the view information may include one or more visible ranges of viewing angles within the panorama for a window in time within the segment duration.

The view information component may be configured to determine, for the window of time within the segment duration, whether a given view range associated with the comment cluster identified is located within and/or outside the one or more visible ranges of viewing angles selected by the user. In some implementations, the view information component may be configured to determine whether the viewing angle(s) associated with one or more targeted comments are located within or outside the one or more visible ranges of viewing angles selected by the user.

The notification component may be configured generate alert information indicating the event within the panoramic content segment is located outside the current field of view selected by the user. The alert information may be generated responsive to a determination that a view range associated with an identified comment cluster is located outside an individual one of the one or more visible ranges of viewing angles selected by the user during the window of time. The alert information may indicate the location of an event within the panoramic content segment indicated by an identified comment cluster. In some implementations, the notification component may be configured to generate alert information indicating that one or more targeted comments are located outside the current field of view selected by the user.

The notification component may be configured to effectuate transmission of the alert information over the network. The alert information may be transmitted to a client computing platform associated with the user. The transmitted alert information may cause the client computing platform associated with the user to effectuate presentation of a notification based on the alert information. In some implementations, a notification presented to the user may be based on alert information indicating a targeted comment is outside the current field of view of the user.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
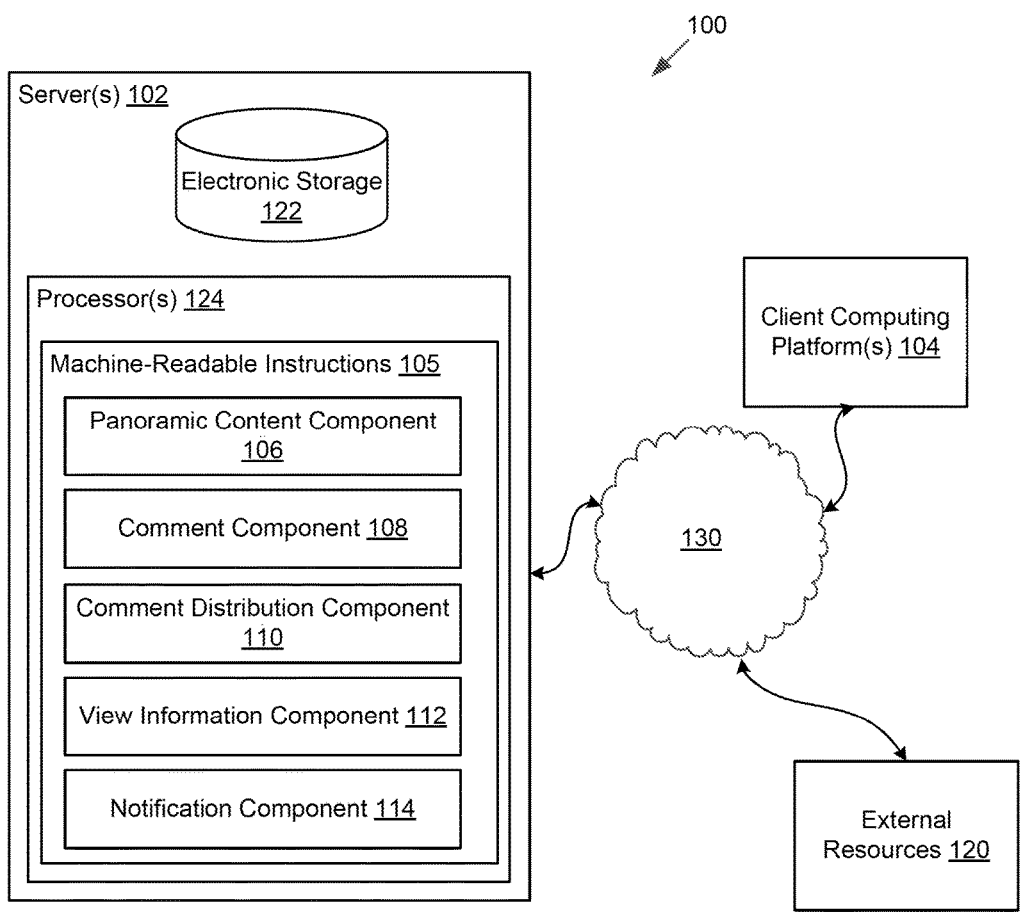
FIG. 1 illustrates a system configured for identifying comment clusters for panoramic content segments, in accordance with one or more implementations.

FIG. 1 illustrates an example system 100 that is configured for identifying comment clusters for panoramic content segments. A panoramic content segment may include digital content presented in a wide view, spherical view, 180-degree view, three-dimensional view, two-dimensional view, and/or other panoramic view. The system and/or method described herein may be configured to receive user comment information conveying user comments directed to various points in time within a segment duration and/or viewing angles within the panorama of a panoramic content segment. The system and/or method may determine comment distributions representing three and/or another number of dimensions of data. For example, number of user comments, points in time across the segment duration, various viewing angles across the panorama of the panoramic content segment, and/or other data. Comment clusters corresponding to user comments for a given period of time and/or at a given location may be identified. The comment clusters may indicate one or more events occurring during the given period of time and/at the given location within the panoramic content segment. The system and/or method may determine whether a view range associated with a comment cluster is within one or more visible ranges defining the user's current field of view for a window of time. Responsive to the view range associated with an identified comment cluster being outside a visible range of viewing angles defining the current field of view selected by the user, alert information may be generated and/or transmitted causing a client computing platform associated with the user (e.g., via which the user may be viewing the panoramic content segment) to present a notification to the user based on the alert information.

As illustrated in FIG. 1, system 100 may include one or more server(s) 102, one or more client computing platform(s) 104, electronic storage 122, one or more physical processor(s) 124 configured to execute machine-readable instructions 105, one or more computer program components, and/or other components.

One or more physical processor(s) 124 may be configured to execute machine-readable instructions. Executing machine-readable instructions 105 may cause the one or more physical processor(s) 124 to identify one or more comment clusters for a panoramic content segments. Machine-readable instructions 105 may include one or more computer program components such as a panoramic content component 106, a comment component 108, a comment distribution component 110, a view information component 112, an notification component 114, and/or other components.

In some implementations, server(s) 102 may be configured to provide remote hosting of the features and/or function of machine-readable instructions 105 to one or more client computing platform(s) 104 that may be remotely located from server(s) 102. However, in some implementations, one or more features and/or functions of server(s) 102 may be attributed as local features and/or functions of one or more client computing platform(s) 104. For example, individual ones of the client computing platform(s) 104 may include machine-readable instructions (not shown in FIG. 1) comprising the same or similar components as machine-readable instructions 105 of server(s) 102. The client computing platform(s) 104 may be configured to locally execute the one or more components that may be the same or similar to the machine-readable instructions 105. One or more features and/or functions of machine-readable instructions 105 of server(s) 102 may be provided, at least in part, as an application program that may be executed at a given client computing platform 104.

The client computing platform(s) 104 may include one or more of a cellular telephone, a smartphone, a digital camera, a laptop, a tablet computer, a desktop computer, a television set-top box, smart TV, a gaming console, and/or other platforms.

Server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting and that the scope of this disclosure includes implementations in which server(s) 102, client computing platform(s) 104, and/or external resources 120 may be operatively linked via some other communication media.

Panoramic content component 106 may be configured to host one or more panoramic content segments of digital content. The panoramic content segments may be hosted to one or more client computing platform(s) 104 on which users may consume the panoramic content segments. Panoramic content component 106 may be configured to host the panoramic content segments of digital content over a network. For example, the panoramic content segments may be hosted over the internet such that users may access the panoramic content segments via the internet. Hosting panoramic content segments over the internet may include uploading and/or storing the panoramic content segments on one or more server(s) 102 wherein the servers process requests and/or deliver the panoramic content segments to client computing platform(s) 108. This may include serving separate digital files for the panoramic content segments, streaming the panoramic content segments, and/or other delivery mechanisms. Panoramic content component 106 may be configured to host the panoramic content segments over a network by communicating information (e.g., via streaming digital content data, and/or other visual information) from server(s) 102 to client computing platform(s) 104 for presentation on displays associated with the client computing platform(s) 104. The digital content transmitted to a given client computing platform 104 may correspond to a panoramic content segment being presented for consumption by user at the given client computing platform 104.

Users may consume the panoramic content segments by viewing the panoramic content segments via a client computing platform 104 and/or an associated display device. Client computing platform(s) 104 may include one or more display devices configured to display the panoramic content segments. In some implementations, the users may consume the panoramic content segments via a head mounted display. For example, a virtual reality headset, an augmented reality headset, and/or other head mounted display.

A panoramic content segment may include any wide angle view of a digital content segment, a digital content segment having multiple views, and/or a view of a digital content segment wherein at least a portion of the digital content is outside the field of view of a user watching the digital content at a given time. For example, the panoramic content segment may include one or more of a spherical view of the digital content segment, a 180-degree view of the digital content segment, a wide view of the digital content segment, a three-dimensional view of the digital content segment, a two-dimensional view of the digital content segment, and/or other views of the digital content segment. The panorama of the panoramic content segment may include the entirety of the digital content presented in the panoramic content segment at a given point in time.

A field of view within a panorama of the panoramic content segment may be selectable by a user during presentation of the panoramic content segment. For example, the user may look around within the panoramic content segment and change his or her field of view and/or viewpoint. In some implementations, the panorama may include a three-dimensional presentation of the panoramic content segment. A user may walk around within the panoramic content segment, turn to change his field of view and/or viewpoint, move closer to an object and/or to view an event, and/or otherwise select his field of view and/or viewpoint. The user's current field of view may include and/or reflect the user's viewpoint. One or more sensors (e.g., external resources 120) may be configured to communicate with system 100 in order to provide view information indicating the user's current field of view and/or visible range of viewing angles at a given point in time. The panoramic content segment may have a beginning, an ending, and/or a segment duration from the beginning to the ending. The beginning, ending, and/or segment duration may be configurable by a controlling entity. A controlling entity may include one or more entities or individuals other than consumers (i.e., the users that consume the panoramic content segments) authorized to use the panoramic content segments, and/or digital content to a promote an interest.

In some implementations, the comment distribution, user comments, and/or other associated with a given panoramic content segment may be presented within the panorama. For example, as the panoramic content segment is presented, the user comments associated with the current point in time within the segment duration and/or a location within the current field of view, may be displayed within the panorama (e.g., within a comments bar, within a comments section, at the associated location, and/or at other locations within the panorama).

Figure 2:
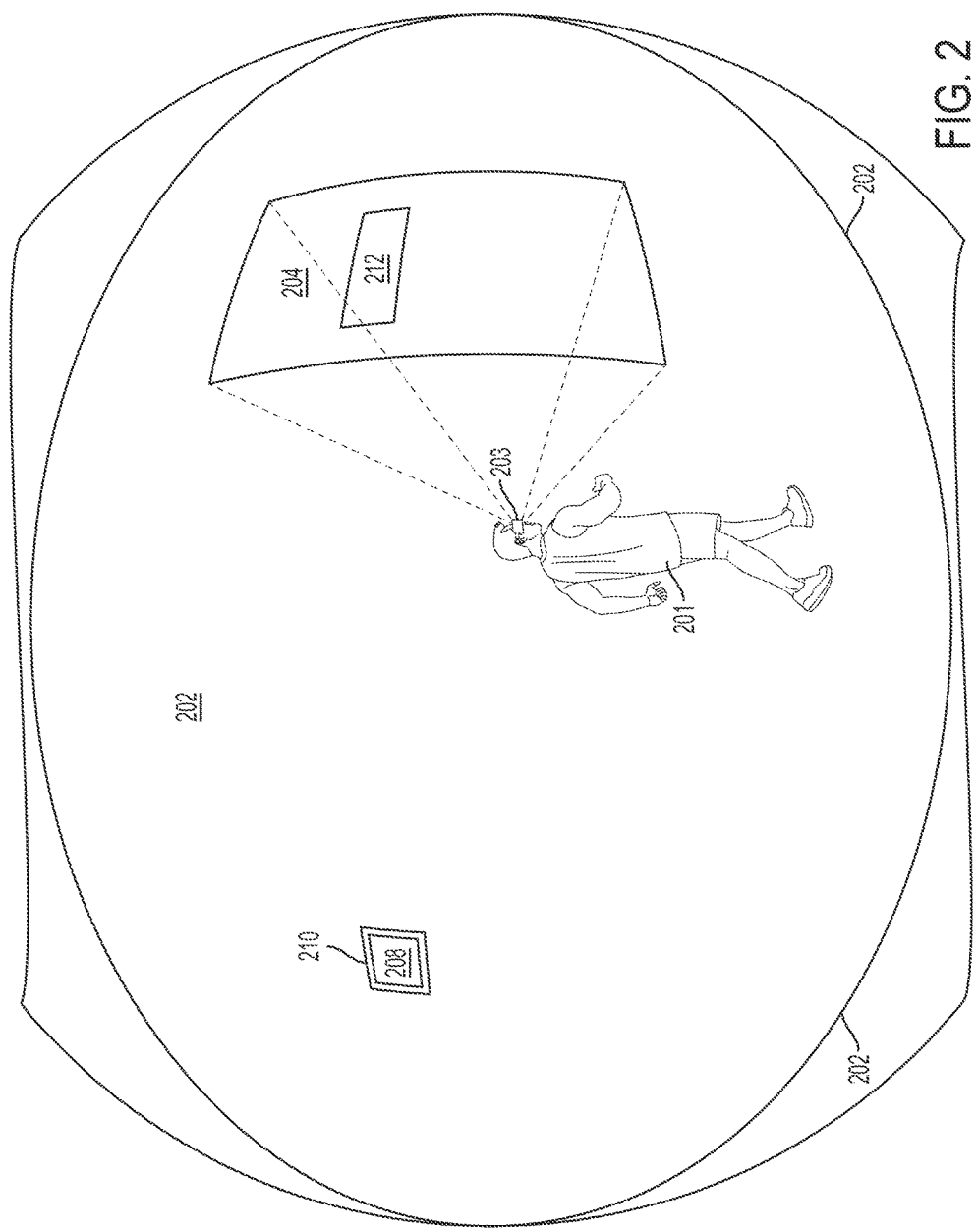
FIG. 2 illustrates an example panoramic content segment being presented to a user, in accordance with one or more implementations.

By way of illustration, FIG. 2 depicts an example panoramic content segment 202 being presented to user 201, in accordance with one or more implementations. FIG. 2 may represent an illustration of panoramic content segment 202 being consumed by user 201 at an individual point in time within the segment duration (e.g., 30 seconds into the segment duration, at t=30) of panoramic content segment 202. Panoramic content segment 202 may include virtual reality and/or three-dimensional panoramic digital content presented in a spherical view (e.g., the user can look 360 degrees in every direction). Panoramic content segment 202 may be presented to user 201 via head mounted display 203 (e.g., the same as or similar to client computing platform(s) 104 and/or display devices associated with client computing platform(s) 104). User 201 may be able to select his current field of view such that visible range 204 represents the current field of view of user 201 at the individual point in time within the segment duration (e.g., t=30).

Event 208 may be indicated by a comment cluster identified based on a comment distribution for panoramic content segment 202. Event 208 may be located within view range 210. View range 210 may be determined based on the comment cluster indicating event 208 being identified based on user comment information including location indications that identified view angles within view range 210 for a period of time (e.g., indicated by time indications included in the user comment information). View range 210 (e.g., associated with an identified comment cluster) may be located outside of visible range 204 at the individual point in time (e.g., t=30) within the segment duration. As such, notification 212 may presented to user 201 within visible range 204 to indicate event 208 (e.g., which may be indicated by the comment cluster identified) is outside of the current field of view of the user.

Returning to FIG. 1, the panoramic content segments may include segments of panoramic digital content that is viewed, distributed, and/or created on a computer. Panoramic digital content may include one more of more of panoramic digital video content, panoramic digital imagery content, panoramic web pages and/or websites, and/or other panoramic digital and/or media content. For example, the panoramic digital content may include a playback of live captured video content (e.g., captured via one or more cameras), produced video segments, behind the scenes presentations, how-to content, product walkthrough videos, and/or other digital content. For example, a panoramic content segment of a digital video may include a two-minute panoramic video clip.

Comment component 108 may be configured to receive user comment information. The user comment information may be transmitted over the network by one or more client computing platform(s) 104 such that it is received by comment component 108. The user comment information may convey one or more user comments for the panoramic content segments. For example, the user comment information received by comment component 108 may convey a first user comment for the panoramic content segment.

The user comments may be directed to one or more events that occur within the panoramic content segments. Events may include any occurrence within a panoramic content segment such as a notable moment and/or interesting point in time within the segment duration. Events may be something users decide to comment on within a panoramic content segment. For example, an event may include one or more of a highlight or a climax of a panoramic video segment, something occurring within the panoramic content segment apart from a focal (e.g., action) point of the panoramic content segment, and/or other event within the panoramic content segment. For example an event may include presentation of: a snowboarder landing an impressive jump, a noteworthy rally in a beach volleyball game, a memorable moment within a wildlife video capture, a fans' sign at a sporting event outside the field of view of the event action, a crowd reaction within a surfing video outside the field of view of the surfing action, a beautiful nature scene away from the subject wildlife, and/or any other events presented within the panoramic content segment.

The user comment information received by comment component 108 may include one or more time indications, location indications, content information (e.g., text, tags, emojis, images, and/or other content included in the comments), content topic information, length information, and/or other information associated with one or more user comments. The one or more user comments may be submitted by the one or more users consuming (e.g., viewing) the panoramic content segments.

User comments may include one or more of text, a tag, an emoji, an image, and/or other content selected by a commenting user. In some implementations, users may submit comments via a quick comment input such as, for example, a force touch, a quick comment affordance, and/or other inputs. Quick comments may be inputted on and/or via one or more user interfaces. For example, comments selected via the quick comment input may include an emoji and/or emotion such that users may be able to quickly express their emotions and/or feelings related to the panoramic content segment at a given time without typing a string of text. In some implementations, one or more emojis, emotion comments, and/or quick comments may impact a comment distribution for the panoramic content segment.

An individual time indication may identify a point in time in the segment duration of the panoramic content segment. For example, the user comment information conveying the first user comment for the panoramic content segment may include a time indication that identifies a point in time in the segment duration of the panoramic content segment. The time indications may describe points in time to which the user comments are directed. The user comments may be related and/or directed to events presented within the panoramic content segment at the time indications.

The points in time may be selectable by the users such a user may be able to choose where in the segment duration to direct their comment. For example, a user may determine the time indication associated with his comment by selecting a point in time within the segment duration, by submitting his comment such that it is automatically associated with a timestamp corresponding to a submission time within the segment duration, and/or through other interface mechanisms. The time indications may include a single point in time, a range in time, multiple points in time, and/or other time indications within the segment duration.

An individual location indication may identify a viewing angle within the panorama of the panoramic content segment. For example, the user comment information conveying the first user comment for the panoramic content segment may include a location indication that identifies a viewing angle within the panorama of the panoramic content segment. The location indications may describe locations within the panorama to which the user comments are directed. The user comments may be related and/or directed to events presented within the panoramic content segment at the viewing angles identified by the location indications.

The location indications may identify one or more viewing angles. The viewing angles may be selectable by the users such that a user may be able to choose a location within the panorama of the panoramic content segment to direct their comment. For example, a user may determine the location indication associated with his comment by selecting a viewing angle within the panorama, by submitting his comment such that it is automatically associated with a viewing angle within a current field of view of the user, and/or through other interface mechanisms. The location indication identifying a viewing angle may include one or more of a range of viewing angles, an individual view point, a view point and it's vicinity, and/or other location indications within the segment duration. Events indicated by comment clusters associated with viewing angles located within the current field of view of the user may be visible to the user. Events indicated by comment clusters associated with viewing angles located outside the current field of view of the user may not be visible to the user.

The viewing angle may include one or more dimensions of view information identifying where within the panorama a comment is directed, and/or what field(s) of view will be able to observe the portion of the panoramic content segment to which the comment is directed. For example, the viewing angle may include one or more of horizontal view information, vertical view information, depth view information, and/or other view information. The view information may be defined by one or more of a Cartesian coordinate system, a cylindrical and/or polar coordinate system, a spherical and/or polar coordinate system, other coordinate system, and/or other data.

In some implementations, wherein the panoramic content segment includes a three-dimensional and/or spherical virtual reality content segment, a location indication identifying a viewing angle associated with a user comment may include a where within the horizontal field of view (e.g., left to right), where within the vertical field of view (e.g., height, up, and/or down), at what depth within the field of view (e.g., towards and/or away from), and/or other location information. For example, wherein the panoramic content segment includes a three-dimensional panoramic content segment and/or a two-dimensional panoramic content segment, the viewing angle may include a horizontal view information, vertical view information, and/or other view information.

In some implementations, the user comment information may include targeted comment information. The targeted comment information may convey one or more targeted comments for the panoramic segment. A targeted comment may include a comment wherein the represented source includes one or more of another user that is connected to the viewing/consuming user via a social networking platform, a controlling entity, and/or other another user or entity. A controlling entity may be one or more entities or individuals other than consumers (i.e., the users that consume the panoramic content segments) authorized to use the panoramic content segments, and/or digital content to a promote an interest. For example, a controlling entity may include one or more of a talent of a panoramic content segment, an entity or individual acting on behalf of the talent, a distribution platform operator, a producer of the panoramic content segment, an advertiser, an owner of the panoramic content segment, an entity having rights to the panoramic content segment, and/or other controlling entities. For example, the talent of a panoramic content segment may include one or more athletes or performers featured in the panoramic content segment. An entity or individual acting on behalf of the talent, for example, may include one or more of a manager, an employee, and/or other user acting on behalf of and/or for the benefit of the talent. For example, an entity acting on behalf of a talent may include a social media content developer commenting on behalf of a fictional and/or animated talent. A platform operator may include one or more administrators and/or operators of a content platform through which the panoramic content segments of digital content may be presented to the users that consume the panoramic content segments. For example, an administrator of a social media platform (e.g., YOUTUBE®, FACEBOOK®, TWITTER®, and/or other platforms) may be a platform operator.

A producer of the panoramic content segment may include individual(s) and/or entities responsible for producing and creating the panoramic content segment and/or the digital panoramic content. For example, a producer may include one or more of a developer, camera operator, producer, editor, director, screenwriter, and/or other producer of the panoramic content segment and/or digital content. An advertiser may include one or more individuals and/or entities advertising and/or promoting something (e.g., an individual, product, service, entity, concept, etc.). For example, a sponsor (e.g., clothing sponsor) of the talent (e.g., a skater) featured in a panoramic content segment may be an advertiser. An owner of the panoramic content segment may include one or more individuals and/or entities that has controlling rights to the panoramic content segment and/or the digital content. For example, a network such as the Entertainment and Sports Programming Network (ESPN®) may own the panoramic content segment and/or digital content created by their employees and/or contractors for a sporting event. An entity having rights to the first panoramic content segment may include one or more entities and/or individuals having rights (e.g., intellectual property rights) to publish, distribute, modify, license, and/or otherwise use the panoramic content segment and/or digital content. An entity and/or individual having rights to the panoramic content segment and/or digital content may and/or may not be the same as the owner of the panoramic content segment and/or digital content.

In some implementations, the targeted comment information may include a targeted time indication that identifies a point in time in the segment duration of the panoramic content segment associated with a targeted comment. The targeted comment information may include a targeted location indication that identifies a viewing angle within the panorama of the panoramic content segment associated with the targeted comment. For example, a targeted comment from a controlling entity may provide one or more of behind the scenes information, equipment information (e.g., describing the settings, accessories, camera, lens, and/or other equipment used to capture a given portion of the content segment), location information (e.g., describing the location and/or destination captured in the content segment), advertisement information, motivation and/or hype generating information, and/or other information. The targeted comment information may include one or more time indications, location indications, content information (e.g., text, tags, emojis, images, and/or other content included in the comments), content topic information, length information, and/or other information associated with one or more targeted comments. In some implementations, The one or more targeted comments may be submitted and/or selected by a controlling entity. For example, targeted comments may include one or more user comments selected by a controlling entity. The one or more user comments may be selected to be a targeted comment based on one or more of a popularity of the user and/or comment, the interaction level of the user, and/or other factors.

Comment distribution component 110 may be configured to determine one or more comment distributions for one or more panoramic content segments. The comment distributions may be determined from the user comment information (e.g., from time indications, location indications, and/or other user comment information). The comment distributions may represent three and/or any other number of dimensions of data. The user comments may be plotted as a function of number of user comments, points in time across the segment duration, viewing angles across the panorama of the panoramic content segment, and/or otherwise plotted. For example, the comment distributions may indicate the quantity of user comments directed to various viewing angles at various points in time within the segment duration.

Comment distribution component 110 may be configured to generate a graphical representation of the determined comment distribution for the panoramic content segment. The graphical representation of the comment distribution may include a heat map, a two and/or three dimensional bubble chart, and/or other graphical representation of number of comments and/or viewing angles across the panorama of the panoramic content segment, against points in time across the segment duration. In some implementations, an individual comment distribution may include multiple distributions and/or plots of the user comments that collectively represent the comment distribution including the number of user comments, points in time across the segment duration, viewing angles across the panorama of the panoramic content segment, and/or other information.

Figure 3:
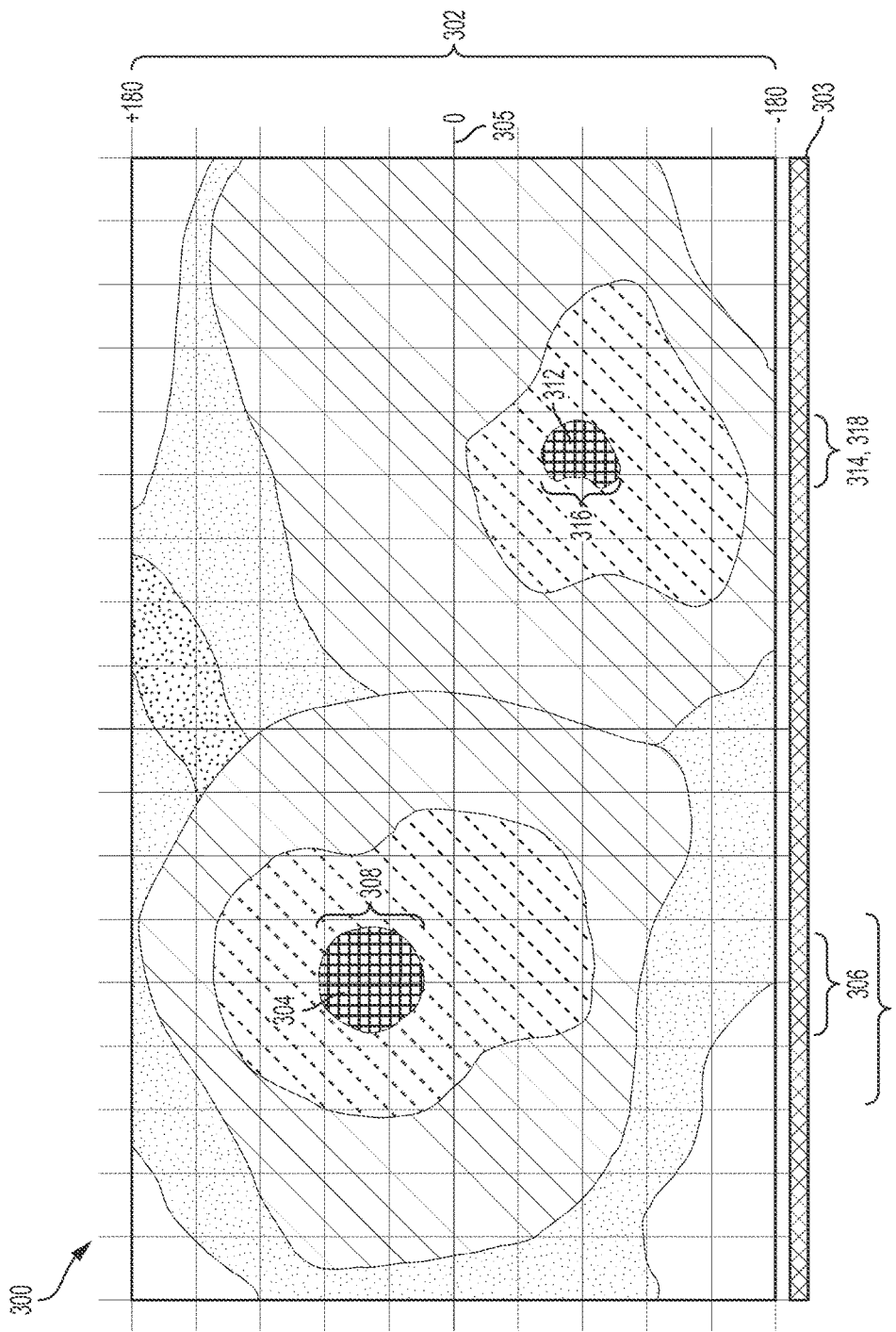
FIG. 3 illustrates an example comment distribution determined by a system configured for identifying comment clusters for panoramic content segments, in accordance with one or more implementations.

By way of illustration, FIG. 3 depicts an example comment distribution 300 determined by a system (e.g., the same as or similar to system 100) configured for identifying comment clusters for panoramic content segments, in accordance with one or more implementations. Comment distribution 300 may be represented by a heat map indicating the number of user comments for a segment duration of the associated panoramic content segment. Timeline 303 may correspond to the segment duration of the panoramic content segment from the beginning to the ending of the panoramic content segment. Comment distribution 300 may be determined by a comment distribution component (e.g., same as or similar to comment distribution component 110).

Comment distribution 300 may represent the number of user comments as a function of time across the segment duration represented by timeline 303. For example, moving from left to right across timeline 303 and/or comment distribution 300 may represent moving across the segment duration from the beginning to the end. Comment distribution 300 may illustrate the number of user comments conveyed by the user comment information at various time indications. The number of user comments may be represented by an individual data point, a color or shading corresponding to a range of number of comments, an object with its size corresponding to a number of user comments, and/or other representations within comment distribution 300.

Comment distribution 300 may represent the viewing angles within a panorama 302 of the panoramic content segment associated with the user comments as a function of time across the segment duration represented by timeline 303. Comment distribution 300 may illustrate the viewing angles associated with the user comments at various time indications. The viewing angles may correspond to the location within panorama 302 that the user comments are directed to. For example, the user comments located within comment distribution 300 at and/or near zero viewing angle 305, may be directed to a location within the panorama that corresponds to a front and/or straight forward viewing angle of the viewing users'. The user comments located within comment distribution 300 between 0 and +180 degrees, may be directed to any location within the panorama that corresponds to a location at and/or between one or more of: a viewing angle slightly to the right of a straight forward viewing angle (e.g., between greater than 0 degrees and around and/or at 45 degrees), a viewing angle to the right of a straight forward viewing angle (e.g., around and/or at 45 degrees), a viewing angle towards a users' right side (e.g., between around and/or at 45 degrees and around and/or at 90 degrees), a viewing angle behind the user towards the right (e.g., at and/or near 135 degrees), a viewing angle behind a straight forward viewing angle, (e.g., at and/or near 180 degrees), and/or other viewing angles.

Returning to FIG. 1, comment distribution component 110 may be configured to identify one or more comment clusters based on the comment distribution for the panoramic content segment. A comment cluster may be identified based on the user comment information. For example, a comment cluster may include comments close together in time (e.g., within a time period) within the segment duration and/or close together in viewing angles (e.g., within a view range) within the panorama of the content segment. The comment clusters may be identified based on the user comment information including time indications that identify points in time that are within a given period of time within the segment duration. The given period of time may include a range of time within the content segment that user comments are directed to. The comment clusters may be identified based on the user comment information including location indications that identify viewing angles that are within a given view range within the panorama of the content segment. The given view range may include a range of viewing angles within the panorama that user comments are directed to. As such, for example, a comment cluster may be identified where user comments are directed to points in time that are close together (e.g., from time (t) t=:30 to t=:33) within the segment duration such that the points in time fall within the given time period (e.g., from second:30 to second:33 within the segment duration); and/or where user comments are directed to viewing angles that are close together (e.g., from a viewing angle of 36 degrees to a viewing angle of 45 degrees) within the panorama such that the viewing angles fall within the given view range (e.g., 36 degrees to 45 degrees).

The comment cluster may indicate an event within the panoramic content segment at a point in time within the given period of time and at a location within the given view range. For example, a comment cluster identified based on the user comment information may include time indications that identify points in time that are within a first period of time within the segment duration and/or location indications that identify viewing angles that are within a first view range within the panorama. As such, the comment cluster may indicate an event within the panoramic content segment at a point in time within the first period of time and/or at a location within the first view range.

Returning to FIG. 3, comment clusters 304 and 312 may be identified within comment distribution 300. Comment cluster 304 may be identified based on user comment information that includes time indications within period of time 306. Comment cluster 304 may be identified based on user comment information that includes location indications indication viewing angles within view range 308. Comment cluster 312 may be identified based on user comment information that includes time indications within period of time 314. Comment cluster 312 may be identified based on user comment information that includes location indications indication viewing angles within view range 316.

Returning to FIG. 1, comment distribution component 110 may be configured to identify one or more targeted comments from the user comments received. The one or more targeted comments may be identified based on a represented source of the targeted comment, content included in the targeted comment, and/or other information. A represented source may include the true source (e.g., Jim commenting as Jim), and/or a portrayed and/or displayed source (e.g., Jim commenting as GOPRO® where GOPRO® is the represented source). For example, an advertiser (e.g., a controlling entity) may place an target comment including an advertisement within the panoramic content segment which may be identified as a targeted comment based on the represented source including a controlling entity. Content included in the targeted comment may include a tag. The tag may indicate that the targeted comment is directed to the user. For example, another user that is connected via a social network with the user consuming the panoramic content segment may comment on an event within the panoramic content segment. Continuing the example, the other user's comment may be identified as a targeted comment based on a tag (e.g., tagging the consuming user in the comment) and/or based on the other user being connected via the social network to the user consuming the panoramic content segment.

View information component 112 may be configured to receive view information from a client computing platform associated with the user. The view information may be received over the network. The view information may be received by view information component 112 in a recurring or ongoing matter. The view information may indicate a current field of view selected by the user during presentation of the panoramic content segment. The current field of view selected by the user may change one or more times over the course of presentation of the panoramic content. The current field of view selected by the user may include the viewing angles visible to the user at a current point in time. The view information may include one or more visible ranges of viewing angles within the panorama for a window in time within the segment duration.

The window of time within the segment duration may include and/or correspond to the period of time associated with one or more of the identified comment clusters. The window of time may correspond to a time and/or range of time relevant to an event indicated by an identified comment cluster. The window of time within the segment duration may include a separate or partially separate window of time, a period of time associated with an identified comment cluster, the segment duration, and/or another point in time, portion of time, and/or range of time within the segment duration of the panoramic content segment. For example, the window of time may include a portion of the duration of the panoramic content segment that begins prior to the period of time begins such that the view information may indicate the current field of view of the user prior to the beginning of the period of time for the event indicated by the identified comment cluster. The window of time may be determined by view information component 112, and/or selected and/or otherwise indicated by a user. The window of time within the segment duration may correspond to a period of time relevant to an event associated with an identified comment cluster occurs.

Returning to FIG. 3, window of time 310 may be associated with comment cluster 304 and/or window of time 318 may be associated with comment cluster 312. View information indicating the current field of view selected by a user consuming the panoramic content segment may be received by a system (e.g., the same as or similar to system 100) for window of time 310 and window of time 318. Window of time 310 may begin prior to period of time 306 within timeline 303. As such, the view information indicating the user's current field of view may be received prior to period of time 306 and/or the occurrence of an event within the panoramic content segment indicated by comment cluster 304. In some implementations, window of time 318 and period of time 314 for comment cluster 312 may be the same and/or substantially similar (e.g., beginning and/or ending at the same time and/or within a few seconds and/or milliseconds of each other). The view information indicating the user's current field of view may be received during period of time 314 and/or the occurrence of an event within the panoramic content segment indicated by comment cluster 312.

Returning to FIG. 1, view information component 112 may be configured to determine whether a given view range associated with the identified comment cluster is located within and/or outside the one or more visible ranges of viewing angles selected by the user. Whether the given view range associated with the identified comment cluster is located within and/or outside the one or more visible ranges of viewing angles may be determined for the window of time within the segment duration, for the period of time associated with the comment cluster identified, for the segment duration of the panoramic content segment, and/or for another point in time, portion of time, and/or range of time within the segment duration of the panoramic content segment.

In some implementations, whether a given view range associated with the comment cluster identified is located within and/or outside the one or more visible ranges of viewing angles selected by the user may be determined locally by the one or more client computing platforms and/or associated display devices through which a panoramic content segment is being presented. A given client computing platform and/or associated display device may be configured to determine the view information that includes one or more visible ranges of viewing angles. The given client computing platform and/or associated display device may be configured to determine, at one or more points in time for the window of time, whether the view range associated with the comment cluster identified is located within and/or outside the one or more visible ranges.

In some implementations, within the one or more visible ranges may include completely and/or partially within one or more of the individual ones of the visible ranges. Outside the one or more visible ranges may include completely and/or partially outside, and/or off-centered within one or more of the individual ones of the visible ranges. In some implementations, the determination of whether a given view range associated with an identified comment cluster is located within and/or outside the one or more visible ranges of viewing angles selected by the user may be determined in an ongoing and/or reoccurring manner for the segment duration of the panoramic content segment.

In some implementations, view information component 112 may be configured to determine whether the viewing angle(s) associated with one or more targeted comments are located within or outside the one or more visible ranges of viewing angles selected by the user. Whether the viewing angle(s) associated with one or more targeted comments are located within or outside the one or more visible ranges may be determined for one or more target windows of time. An individual target window of time may be related to an individual target comment and/or a targeted time indication that identifies a point in time in the segment duration associated with an individual targeted comment.

Notification component 114 may be configured generate alert information indicating the event within the panoramic content segment is located outside the current field of view selected by the user. The alert information may be generated by notification component 114 responsive to a determination that a view range associated with an identified comment cluster is located outside an individual one of the one or more visible ranges of viewing angles selected by the user during the window of time. The alert information may indicate the location of an event within the panoramic content segment indicated by an identified comment cluster. The alert information may include the view range, period of time, and/or other information related to an event indicated by an identified comment cluster.

In some implementations, notification component 114 may be configured to generate alert information indicating that one or more targeted comments are located outside the current field of view selected by the user. Generating the alert information indicating that one or more targeted comments are located outside the current field of view selected by the user may be responsive to a determination that, for the target window of time, the viewing angle associated with the targeted comment is located outside the one or more visible ranges of viewing angles selected by the user during the target window of time.

Notification component 114 may be configured to effectuate transmission of the alert information over the network. The alert information may be transmitted to a client computing platform associated with the user. The transmitted alert information may cause the client computing platform associated with the user to effectuate presentation of a notification based on the alert information. The notification may include one or more of a visible notification, an audible notification, a sensory notification, and/or other types of notifications. For example, the notification may include an alert message presented within the panoramic content segment within the current field of view of the user (see e.g., FIG. 2). The notification, for example, may include an alert sound audible to the user. An example sensory notification may include a vibration, a smell, and/or light notification. The notification may indicate to the user that he is missing and/or about to miss an event presented within the panoramic content segment outside his current field of view.

A visible notification may be presented at and/or near the center of the current field of view of the user, in the periphery of the current field of view of the user, and/or at other locations within the panorama of the panoramic content segment. An audible notification may include a notification sound played by a speaker, within one or more earphones, within one or both sides of headphones, and/or other notifications. A sensory notification may be delivered via the client computing platform, one or more display devices associated with the client computing platform, one or more control (e.g., user interfacing) devices associated with the client computing platform, and/or other devices.

The notification may indicate where within the panorama of the panoramic content segment the event indicated by an identified comment cluster is taking and/or is about to take place. For example, a visible notification may include "Look to your left to see something cool!" An audible notification, for example, may include a spoken message of "Don't miss what is happening to your right!" and/or a sound played in the right ear of the user indicating the user should look to the right.

In some implementations, a notification presented to the user may be based on the alert information indicating a targeted comment is outside the current field of view of the user. The notification may indicate to the user that he is missing and/or about to miss an event associated with a targeted comment and/or a targeted comment within the panoramic content segment outside his current field of view.

Figure 4:
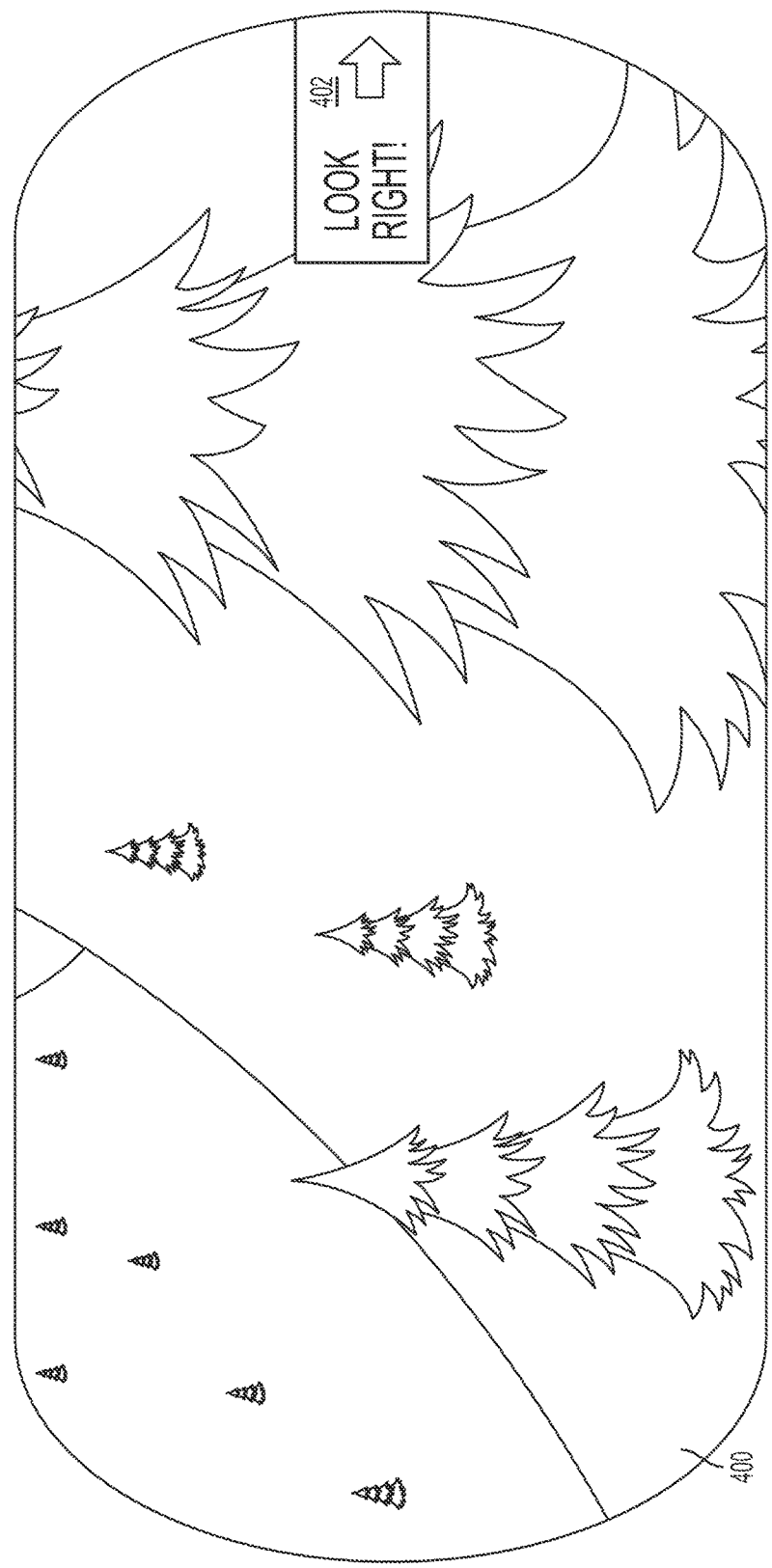
FIG. 4 illustrates an example current field of view of a panoramic content segment including a notification, in accordance with one or more implementations.

By way of illustration, FIG. 4 depicts an example current field of view 400 of a panoramic content segment including a notification, in accordance with one or more implementations. Field of view 400 may represent the visible range of viewing angles selected by a user viewing the panoramic content segment at a given point in time within the segment duration. Field of view 400 may be observed by the user via a head-mounted display. Responsive to a determination (e.g., by a view information component the same as or similar to view information component 112 illustrated in FIG. 1) that a view range associated with an identified comment cluster is located outside the visible range of viewing angles represented by field of view 400, notification 402 may be presented within field of view 400. Notification 402 may indicate an event within the panoramic content segment is located outside field of view 400. Notification 402 may indicate a direction toward which the user should look (e.g., that the user is not presently looking in) to observe the portion of the panoramic content segment to which the comment cluster identified, indicating the event within the panoramic content segment, is directed.

In some implementations, the comment distributions may be used for editing the panoramic content segment. For example, editing the panoramic content segment may include one or more of: selecting and/or compiling a non-panoramic version of the panoramic content segment; selecting and/or compiling a two dimensional version of a three dimensional panoramic content segment; augmenting (e.g., removing content, etc.), enhancing (e.g., color correcting, etc.), and/or otherwise refining one or more portions and/or sections (e.g., frames, and/or other portions and/or sections) of the panoramic content segment; and/or otherwise editing one or more portions and/or sections (e.g., frames, and/or other portions and/or sections) of the panoramic content segment. The comment distributions and/or the comment clusters identified based on the comment distributions for the panoramic content segment may indicate one or more portions and/or sections (e.g., frames, and/or other portions and/or sections) of the panoramic content segment that should be edited. The panoramic content segment may be edited, for example, by a controlling entity. In some implementations, the panoramic content segment may be edited based on the comment distributions, the comment clusters identified, and/or other information. The comment distributions and/or the comment clusters identified may be used to select portions and/or sections from a panoramic content segment to edit. By way of example, a comment distribution and/or one or more comment clusters identified for a 360 degree capture (e.g., panoramic content segment) may be used to select frames, portions, and/or sections for editing.

Returning to FIG. 1, the server(s) 102, client computing platforms 104, and/or external resources 120 may be operatively linked via one or more electronic communication links. For example, such electronic communication links may be established, at least in part, via a network 130 such as the Internet and/or other networks. It will be appreciated that this is not intended to be limiting and that the scope of this disclosure includes implementations in which server(s) 102, client computing platforms 104, and/or external resources 120 may be operatively linked via some other communication media.

The external resources 120 may include sources of information, hosts and/or providers of virtual spaces outside of system 100, external entities participating with system 100, external entities for digital content and/or digital content platforms, and/or other resources. In some implementations, some or all of the functionality attributed herein to external resources 120 may be provided by resources included in system 100.

The server(s) 102 may include electronic storage 122, one or more processor(s) 124, and/or other components. The server(s) 102 may include communication lines or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 are configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 are shown in FIG. 1 as a single entity, this is for illustrative purposes only. In some implementations, processor(s) 124 may include one or more processing units. These processing units may be physically located within the same device, or processor(s) 124 may represent processing functionality of a plurality of devices operating in coordination. The processor 124 may be configured to execute components 106-114. Processor 124 may be configured to execute components 108, 110, 111, 112, and/or 114, by software; hardware; firmware; some combination of software, hardware, and/or firmware; and/or other mechanisms for configuring processing capabilities on processor(s) 124.

It should be appreciated that although components 106-114 are illustrated in FIG. 1 as being located and/or co-located within a particular component of system 100, in implementations in which physical processor(s) 124 include multiple processing units, one or more of components 106-114 may be located remotely from the other components. The description of the functionality provided by the different components 106-114 described herein is for illustrative purposes, and is not intended to be limiting, as any of components 106-114 may provide more or less functionality than is described. For example, one or more of components 106-114 may be eliminated, and some or all of its functionality may be incorporated, shared, integrated into, and/or otherwise provided by other ones of components 106-114. Note that physical processor(s) 124 may be configured to execute one or more additional components that may perform some or all of the functionality attributed herein to one of components 106-114.

One or more of the components of system 100 may be configured to present and/or provide a user interface to provide an interface between system 100 and a user (e.g. a controlling entity, and/or other users using a graphical user interface) through which the user can provide information to and receive information from system 100. This enables data, results, and/or instructions (e.g., determinations, selections, and/or other indications) and any other communicable items, collectively referred to as "information," to be communicated between the user and system 100. An example of information that may be conveyed by a user and/or controlling entity is a selected time indication, a selected location indication, a user comment and/or comment information, and/or other information. Examples of interface devices suitable for inclusion in a user interface include one or more of those associated with a computing platform, a keypad, buttons, switches, a keyboard, knobs, levers, a display screen, a touch screen, a mouse, speakers, a microphone, an indicator light, an audible alarm, and/or a printer. Information may be provided to a user by the user interface in the form of a graphical user interface.

It is to be understood that other communication techniques, either hard-wired or wireless, are also contemplated herein as a user interface. For example, in one embodiment, the user interface may be integrated with a removable storage interface provided by electronic storage 122. In this example, information is loaded into system 100 from removable storage (e.g., a smart card, a flash drive, a removable disk, etc.) that enables the user(s) to customize system 100. Other exemplary input devices and techniques adapted for use with system 100 as the user interface include, but are not limited to, an RS-232 port, RF link, an IR link, modem (telephone, cable, Ethernet, internet or other). In short, any technique for communicating information with system 100 is contemplated as the user interface.

Figure 5:
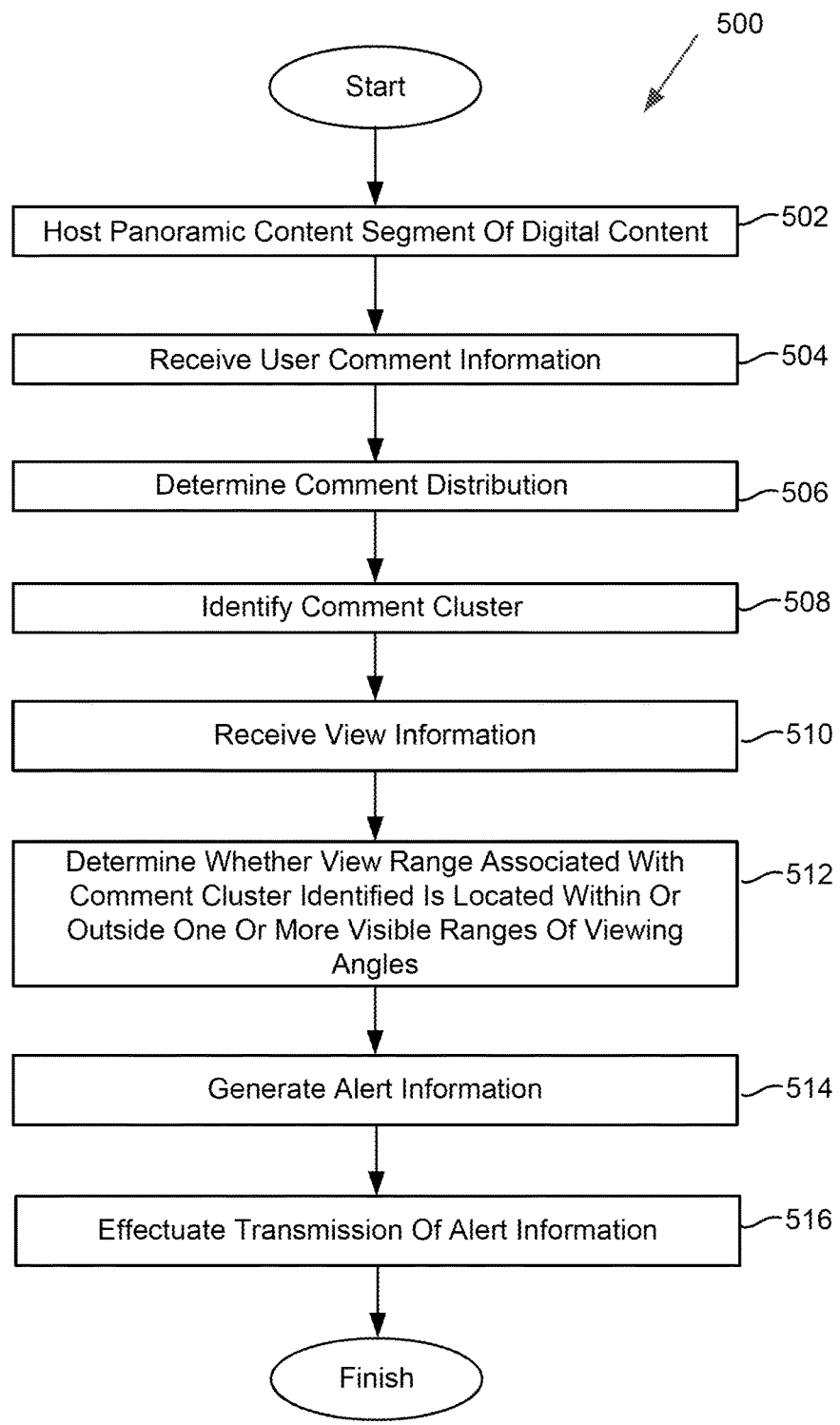
FIG. 5. illustrates a method configured for identifying comment clusters for panoramic content segments, in accordance with one or more implementations.

FIG. 5 illustrates an exemplary method 500 for identifying comment clusters for panoramic content segments, in accordance with one or more implementations. The operations of method 500 presented below are intended to be illustrative and non-limiting examples. In certain implementations, method 500 may be accomplished with one or more additional operations not described, and/or without one or more of the operations discussed. Additionally, the order in which the operations of method 500 are illustrated in FIG. 5 and described below is not intended to be limiting.

In certain implementations, method 500 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

Regarding method 500, at an operation 502, a panoramic content segment of digital content may be hosted over a network. The panoramic content segment of digital content may be hosted to client computing platforms on which users consume the panoramic content segment. A field of view within a panorama of the panoramic content segment may be selectable by a user during presentation of the panoramic content segment. The panoramic content segment may have a beginning, an ending, and/or a segment duration from the beginning to the ending. Presentation of the supplemental content may be effectuated on the client computing platforms. In some implementations, operation 502 is performed by a panoramic content component the same as or similar to panoramic content component 106 (shown in FIG. 1 and described herein).

At an operation 504, user comment information may be received. User comment information may be received over the network from the client computing platforms. The user comment information may convey user comments for the panoramic content segments. The user comment information conveying a first user comment for the panoramic content segment may include a time indication. The time indication may identify a point in time in the segment duration of the panoramic content segment. The user comment information conveying the first user comment for the panoramic content segment may include a location indication. The location indication may identify a viewing angle within the panorama of the panoramic content segment. In some implementations, operation 504 is performed by a comment component the same as or similar to comment component 108 (shown in FIG. 1 and described herein).

At an operation 506, a comment distribution may be determined for the panoramic content segment. The comment distribution may be determined from the user comment information. The comment distribution may represent three dimensions of data such that the user comments are plotted as a function of number of user comments, points in time across the segment duration, and/or viewing angles across the panorama of the panoramic content segment. In some implementations, operation 506 is performed by a comment distribution component the same as or similar to comment distribution component 110 (shown in FIG. 1 and described herein).

At an operation 508, a comment cluster may be identified based on the comment distribution for the panoramic content segment. The comment cluster may be identified based on the user comment information including time indications that identify points in time that are within a first period of time within the segment duration. The comment cluster may be identified based on the user comment information including location indications that identify viewing angles that are within a first view range within the panorama. As such, the comment cluster may indicate an event within the panoramic content segment at a point in time within the first period of time and/or at a location within the first view range. In some implementations, operation 508 is performed by a comment distribution component the same as or similar to comment distribution component 110 (shown in FIG. 1 and described herein).

At an operation 510, view information may be received over the network from a client computing platform associated with the user. The view information may be received in a recurring or ongoing matter. The view information may indicate a current field of view selected by the user during the presentation of the panoramic content segment. The view information may include one or more visible ranges of viewing angles within the panorama for a window in time within the segment duration. In some implementations, operation 510 is performed by a view information component the same as or similar to view information component 112 (shown in FIG. 1 and described herein).

At an operation 512, whether the first view range associated with the comment cluster identified is located within or outside the one or more visible ranges of viewing angles selected by the user may be determined. Whether the first view range associated with the comment cluster identified is located within or outside the one or more visible ranges of viewing angles may be determined for the window of time within the segment duration. In some implementations, operation 512 is performed by a view information component the same as or similar to view information component 112 (shown in FIG. 1 and described herein).

At an operation 514, alert information indicating the event within the panoramic content segment is located outside the current field of view selected by the user may be generated. The alert information may generated responsive to a determination that the first view range associated with the comment cluster identified is located outside an individual one of the one or more visible ranges of viewing angles selected by the user during the window of time. In some implementations, operation 514 is performed by a notification component the same as or similar to notification component 114 (shown in FIG. 1 and described herein).

At an operation 516, transmission of the alert information may be effectuated over the network to a client computing platform associated with the user. Effectuating transmission of the alert information may cause the client computing platform associated with the user to effectuate presentation of a notification based on the alert information. In some implementations, operation 516 is performed by a notification component the same as or similar to notification component 114 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured for determining comment distributions for panoramic digital content, the system comprising:

one or more processors configured by machine readable instructions to:

hosting, over a network, a panoramic content segment of digital content to client computing platforms on which users consume the panoramic content segment such that a field of view within a panorama of the panoramic content segment is selectable by a user during presentation of the panoramic content segment, the panoramic content segment having a beginning and an ending and having a segment duration from the beginning to the ending;

receive, over the network from the client computing platforms, user comment information conveying user comments for the panoramic content segment, the user comment information conveying a first user comment for the panoramic content segment including a time indication that identifies a point in time in the segment duration of the panoramic content segment and a location indication that identifies a viewing angle within the panorama of the panoramic content segment;

determine a comment distribution for the panoramic content segment from the user comment information, the comment distribution representing three dimensions of data such that the user comments are plotted as a function of number of user comments, points in time across the segment duration, and viewing angles across the panorama of the panoramic content segment;

identify a comment cluster based on the comment distribution for the panoramic content segment, wherein the comment cluster is identified based on the user comment information including time indications that identify points in time that are within a first period of time within the segment duration and location indications that identify viewing angles that are within a first view range within the panorama, such that the comment cluster indicates an event within the panoramic content segment at a point in time within the first period of time and at a location within the first view range;

in a recurring or ongoing matter, receive view information over the network from a client computing platform associated with the user indicating a current field of view selected by the user during the presentation of the panoramic content segment, the view information including one or more visible ranges of viewing angles within the panorama for a window in time within the segment duration;

determine, for the window of time within the segment duration, whether the first view range associated with the comment cluster identified is located within or outside the one or more visible ranges of viewing angles selected by the user;

generate, responsive to a determination that the first view range associated with the comment cluster identified is located outside an individual one of the one or more visible ranges of viewing angles selected by the user during the window of time, alert information indicating the event within the panoramic content segment is located outside the current field of view selected by the user, effectuate transmission of the alert information over the network to a client computing platform associated with the user causing the client computing platform associated with the user to effectuate presentation of a notification based on the alert information.

2. The system of claim 1, wherein the digital content includes a playback of live capture digital media.

3. The system of claim 1, wherein presentation of the panoramic content segment and the notification based on the alert information is effectuated via a head mounted display.

4. The system of claim 1, wherein determining the comment distribution for the panoramic content segment includes generating a graphical representation of the comment distribution determined.

5. The system of claim 4, wherein the graphical representation of the comment distributions includes a heat map.

6. The system of claim 1, wherein the user comment information includes targeted comment information conveying one or more targeted comments for the panoramic segment, the targeted comment information including a targeted time indication that identifies a point in time in the segment duration of the panoramic content segment associated with a targeted comment and a targeted location indication that identifies a viewing angle within the panorama of the panoramic content segment associated with the targeted comment.

7. The system of claim 6, wherein the one or more processors are further configured by machine readable instructions to:

identify the targeted comment from the user comments conveyed by the user comment information, wherein the targeted comment is identified based on a represented source of the targeted comment and/or content included in the targeted comment;

determine, for a target window of time, whether the viewing angle associated with the targeted comment is located within or outside the one or more visible ranges of viewing angles selected by the user; and generate, responsive to a determination that, for the target window of time, the viewing angle associated with the targeted comment is located outside the one or more visible ranges of viewing angles selected by the user during the target window of time, the alert information indicating the targeted comment is located outside the current field of view selected by the user such that the notification is based on the alert information indicating the targeted comment is outside the current field of view.

8. The system of claim 7, wherein a represented source of the targeted comment includes one or more of another user that is connected to the user via a social networking platform and/or a controlling entity.

9. The system of claim 8, wherein a controlling entity includes a talent of the panoramic content segment, an entity and/or individual acting on behalf of the talent, a subject of the panoramic content segment, a producer of the panoramic content segment, an advertiser, an owner of the panoramic content segment, and/or an entity having rights to the panoramic content segment.

10. The system of claim 7, wherein the content included in the targeted comment includes a tag, wherein a the tag indicates that the targeted comment is directed to the user.

11. A method, the method being implemented by a computer system including one or more processors and storage media storing machine-readable instructions, the method comprising:

hosting, over a network, a panoramic content segment of digital content to client computing platforms on which users consume the panoramic content segment such that a field of view within a panorama of the panoramic content segment is selectable by a user during presentation of the panoramic content segment, the panoramic content segment having a beginning and an ending and having a segment duration from the beginning to the ending;

receiving, over the network from the client computing platforms, user comment information conveying user comments for the panoramic content segment, the user comment information conveying a first user comment for the panoramic content segment including a time indication that identifies a point in time in the segment duration of the panoramic content segment and a location indication that identifies a viewing angle within the panorama of the panoramic content segment;

determining a comment distribution for the panoramic content segment from the user comment information, the comment distribution representing three dimensions of data such that the user comments are plotted as a function of number of user comments, points in time across the segment duration, and viewing angles across the panorama of the panoramic content segment;

identifying a comment cluster based on the comment distribution for the panoramic content segment, wherein the comment cluster is identified based on the user comment information including time indications that identify points in time that are within a first period of time within the segment duration and location indications that identify viewing angles that are within a first view range within the panorama, such that the comment cluster indicates an event within the panoramic content segment at a point in time within the first period of time and at a location within the first view range;

in a recurring or ongoing matter, receiving view information over the network from a client computing platform associated with the user indicating a current field of view selected by the user during the presentation of the panoramic content segment, the view information including one or more visible ranges of viewing angles within the panorama for a window in time within the segment duration;

determining, for the window of time within the segment duration, whether the first view range associated with the comment cluster identified is located within or outside the one or more visible ranges of viewing angles selected by the user;

generating, responsive to a determination that the first view range associated with the comment cluster identified is located outside an individual one of the one or more visible ranges of viewing angles selected by the user during the window of time, alert information indicating the event within the panoramic content segment is located outside the current field of view selected by the user, effectuating transmission of the alert information over the network to a client computing platform associated with the user causing the client computing platform associated with the user to effectuate presentation of a notification based on the alert information.

12. The method of claim 11, wherein the digital content includes a playback of live capture digital media.

13. The method of claim 11, wherein presentation of the panoramic content segment and the notification based on the alert information is effectuated via a head mounted display.

14. The method of claim 11, wherein determining the comment distribution for the panoramic content segment includes generating a graphical representation of the comment distribution determined.

15. The method of claim 14, wherein the graphical representation of the comment distributions includes a heat map.

16. The method of claim 11, wherein the user comment information includes targeted comment information conveying one or more targeted comments for the panoramic segment, the targeted comment information including a targeted time indication that identifies a point in time in the segment duration of the panoramic content segment associated with a targeted comment and a targeted location indication that identifies a viewing angle within the panorama of the panoramic content segment associated with the targeted comment.

17. The method of claim 16, wherein method further comprises:

identifying the targeted comment from the user comments conveyed by the user comment information, wherein the targeted comment is identified based on a represented source of the targeted comment and/or content included in the targeted comment;

determining, for a target window of time, whether the viewing angle associated with the targeted comment is located within or outside the one or more visible ranges of viewing angles selected by the user; and generating, responsive to a determination that, for the target window of time, the viewing angle associated with the targeted comment is located outside the one or more visible ranges of viewing angles selected by the user during the target window of time, the alert information indicating the targeted comment is located outside the current field of view selected by the user such that the notification is based on the alert information indicating the targeted comment is outside the current field of view.

18. The method of claim 17, wherein a represented source of the targeted comment includes one or more of another user that is connected to the user via a social networking platform and/or a controlling entity.

19. The method of claim 18, wherein a controlling entity includes a talent of the panoramic content segment, an entity and/or individual acting on behalf of the talent, a subject of the panoramic content segment, a producer of the panoramic content segment, an advertiser, an owner of the panoramic content segment, and/or an entity having rights to the panoramic content segment.

20. The method of claim 17, wherein the content included in the targeted comment includes a tag, wherein a the tag indicates that the targeted comment is directed to the user.

* * * * *